US006711715B1

(12) United States Patent
Grealish

(10) Patent No.: US 6,711,715 B1
(45) Date of Patent: Mar. 23, 2004

(54) METHOD AND SYSTEM FOR EFFICIENT STORAGE AND RESTORATION OF DISPLAY STATE DATA

(75) Inventor: Kevin David James Grealish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/384,463

(22) Filed: Aug. 27, 1999

(51) Int. Cl.[7] .............................................. G06F 17/30
(52) U.S. Cl. ...................................... 715/504; 715/503
(58) Field of Search ................................ 707/503, 504

(56) References Cited

U.S. PATENT DOCUMENTS

| | | | | |
|---|---|---|---|---|
| 5,231,577 A | * | 7/1993 | Koss | 707/504 |
| 5,255,356 A | * | 10/1993 | Michelman et al. | 707/504 |
| 5,485,608 A | * | 1/1996 | Lomet et al. | 707/202 |
| 5,598,519 A | * | 1/1997 | Narayanan | 707/504 |
| 5,659,747 A | * | 8/1997 | Nakajima | 713/1 |

* cited by examiner

*Primary Examiner*—Heather R. Herndon
*Assistant Examiner*—Adam Queler
(74) *Attorney, Agent, or Firm*—Merchant & Gould P.C.

(57) ABSTRACT

Storage and restoration of display state data for a display object having a display state that can be altered by display state changes made to other display objects in a hierarchical data structure where the display state of the display object being stored has more than one superior display object. Display state data storage and restoration can be a process that is consumptive of processor and memory resources. A method and system are provided for efficiently storing and restoring display state data for display objects corresponding to data elements in a complex hierarchical data structure. A sequence number generator is used to track display state changes made to a complex display grid. As display state changes are made, a number is associated with the display state change which is, in turn, associated with a display object. As a grid or a portion of the grid is restored, the sequence numbers are analyzed in a sequence determined by the relative superiority of display objects to determine whether a particular display state change needs to be saved and/or restored, thereby avoiding unnecessary restorations of display state changes.

27 Claims, 13 Drawing Sheets

| Country (202) | State (204) | City (206) | Population (208) | Capital (210) | |
|---|---|---|---|---|---|
| Australia | NSW | Bathurst | 30000 | N | 212 |
| Australia | NSW | Orange | 35000 | N | 214 |
| Australia | NSW | Sydney | 3500000 | Y | 216 |
| Australia | NSW | Wagga Wagga | 100000 | N | 218 |
| Australia | NSW | Wollongong | 1000000 | N | 220 |
| Australia | Vic | Albany | 30000 | N | 222 |
| Australia | Vic | Geelong | 100000 | N | 224 |
| Australia | Vic | Melbourne | 2000000 | Y | 226 |
| USA | OR | Eugene | 100000 | N | 228 |
| USA | OR | Portland | 100000 | Y | 230 |
| USA | OR | Springfield | 45000 | N | 232 |
| USA | WA | Olympia | 100000 | Y | 234 |
| USA | WA | Redmond | 200000 | N | 236 |
| USA | WA | Seattle | 2500000 | N | 238 |
| USA | WA | Tacoma | 1000000 | N | 240 |

| Country | State | City | Population | Capital |
|---|---|---|---|---|
| Australia | NSW | Bathurst | 30000 | N |
| | NSW | Orange | 35000 | N |
| | NSW | Sydney | 3500000 | Y |
| | NSW | Wagga Wagga | 100000 | N |
| | NSW | Wollongong | 1000000 | N |
| | Vic | Albany | 30000 | N |
| | Vic | Geelong | 100000 | N |
| | Vic | Melbourne | 2000000 | Y |
| USA | OR | Eugene | 100000 | N |
| | OR | Portland | 100000 | Y |
| | OR | Springfield | 45000 | N |
| | WA | Olympia | 100000 | Y |
| | WA | Redmond | 200000 | N |
| | WA | Seattle | 2500000 | N |
| | WA | Tacoma | 1000000 | N |

| | Capital | | | | | |
|---|---|---|---|---|---|---|
| | N | | | Y | | |
| Country | State | City | Population | State | City | Population |
| Australia | NSW | Bathurst | 30000 | NSW | Sydney | 3500000 |
| | NSW | Orange | 35000 | Vic | Melbourne | 2000000 |
| | NSW | Wagga Wagga | 100000 | | | |
| | NSW | Wollongong | 1000000 | | | |
| | Vic | Albany | 30000 | | | |
| | Vic | Geelong | 100000 | | | |
| USA | OR | Eugene | 100000 | OR | Portland | 100000 |
| | OR | Springfield | 45000 | WA | Olympia | 100000 |
| | WA | Redmond | 200000 | | | |
| | WA | Seattle | 2500000 | | | |
| | WA | Tacoma | 1000000 | | | |

| | Capital | | | | | |
|---|---|---|---|---|---|---|
| | N | | | Y | | |
| Country | State | City | Population | State | City | Population |
| Australia | NSW | Bathurst | 30000 | NSW | Sydney | 3500000 |
| | NSW | Orange | 35000 | Vic | Melbourne | 2000000 |
| | NSW | Wagga Wagga | 100000 | | | |
| | NSW | Wollongong | 1000000 | | | |
| | Vic | Albany | 30000 | | | |
| | Vic | Geelong | 100000 | | | |
| | Sum of Population | | 1295000 | Sum of Population | | 5500000 |
| USA | OR | Eugene | 100000 | OR | Portland | 100000 |
| | OR | Springfield | 45000 | WA | Olympia | 100000 |
| | WA | Redmond | 200000 | | | |
| | WA | Seattle | 2500000 | | | |
| | WA | Tacoma | 1000000 | | | |
| | Sum of Population | | 3845000 | Sum of Population | | 200000 |

|  | Capital ▼ | |
|---|---|---|
|  | N | Y |
| Country ▼ | Sum of Population | Sum of Population |
| Australia | 1295000 | 5500000 |
| USA | 3845000 | 200000 |

201'''

METHOD AND SYSTEM FOR EFFICIENT STORAGE AND RESTORATION OF DISPLAY STATE DATA

TECHNICAL FIELD

The present invention relates generally to the storage and restoration of display data and more particularly to the maintenance of display state data associated with data elements within a data structure having a defined hierarchy of data elements.

BACKGROUND OF THE INVENTION

Users of application programs have become accustomed to having a variety of tools with which to display information that has been processed by the application program. Presentation of data has become almost as important a feature of an application program as the application program's ability to process the data. For example, spreadsheet application programs are typically provided with presentation or display tools enabling a user to highlight important data elements in the spreadsheet and to de-emphasize or even hide other data elements that are less appropriate for presentation purposes. Similarly, database application programs are often provided with display tools that permit the user to display particular data elements of the database in various formats, while hiding or de-emphasizing other data elements.

The display of an application program can be said to be composed of any number of display objects that are associated with the data elements of the application program. For example, in a database program that maintains a list of records, each record having a number of fields, a user may choose to display only particular fields of a single record at a time. The displayed portion of the record is a display object and each displayed field within that record is a display object. On the other hand, each field within each record is a data element. Thus, the display object and the data element are associated with each other, but are not necessarily co-extensive. The characteristics of the display objects do not alter or affect the characteristics of the underlying data elements.

Display objects are typically maintained within a hierarchical data structure with affordances associated with each data element. In the context of this discussion, an affordance is a display characteristic associated with a display object that affords change of the characteristic. As a simple example, if a display object has been formatted with a green background, then the display object's ability to have the background color associated with it changed is referred to as an affordance. The object affords the change of the background color. As another example, if a display object can be hidden (i.e., not displayed to the user), yet still be associated with a data element, then the display object's ability to be hidden is also referred to as an affordance. Notably, affordances are associated with display objects, not data elements. A data element is the underlying data in an application program, whereas a display object is independent of the underlying data. Data elements can be moved within the data element hierarchy, without changing the display objects. Conversely, display objects can be changed without substantively affecting the associated data elements.

The display objects are maintained in a hierarchical data structure, to the extent that the display objects are subject to the display characteristics of a superior display object. Returning to the example of the database record, the display object associated with a particular field in the displayed record is inferior to the display characteristics of the display object associated with the displayed record. If, for example, a user applies a green background to the display object associated with the displayed record, then the display object associated with a field within the record will be assigned a green background, because the record display object is superior to the field display object. If the user subsequently applies a blue background to the field display object, then the record display object is not affected, because the record display object is superior to the field display object.

When a user applies various display characteristics to the display objects of a particular application program or associated data file, the user expects that those display characteristics will be maintained such that the display will look the same way when the user returns to it as when the user left it. For example, a database user may apply display characteristics to a particular record and then exit the application program. When that user restarts the application program, the user will expect that particular record to be displayed as the user left it. That is, the display state of the record should be restored when the user accesses the record.

The storage and restoration of a display state can be accomplished in various ways. The simplest way is to store the display state of each display object associated with a particular application program and/or data file. Unfortunately, as more and more affordances are required by application programs, this method becomes very consumptive of processor time and computer memory. Thus, there is a need for an efficient method for maintaining and tracking changes made to display state data. The method should be simple, so that it can be performed quickly and efficiently. However, the method should be powerful and adaptable, such that multiple affordances can be processed efficiently and new affordances can be accommodated.

SUMMARY OF THE INVENTION

The present invention addresses these needs by maintaining and tracking changes to display state data for display objects contained within a hierarchical data structure where the display state of the objects being tracked has more than one superior display object. Because many display objects within a hierarchical data structure are inferior to more than one other display object, changes made to the superior display objects often determine at least one aspect of the display state of the inferior display objects. The present invention provides an efficient means for storing and restoring display state data, such that the hierarchy may be maintained with a minimal impact on processor and memory resources. Changes to display state data are tracked by means of a sequence number generator that assigns a sequence number to display state changes as they are made by the user. The present invention utilizes a process for storing the display state data and a process for loading (restoring) the stored display state data.

In one aspect of the present invention, a system for storing and restoring display state data for a hierarchical data structure is provided. The system has three main components: a sequence number generator, a display state data storage module, and a display state data restoration module. The sequence number generator is operative to assign a sequence number to each display state change corresponding to each of a number of display objects, as each display state change is made. The storage module is operative to store a sequence number, the display state change made, and a unique identifier corresponding to the display object for which the display state change was made. This display state change data is stored in a display state data module. The restoration module is operative to retrieve the sequence numbers, the corresponding display state changes, and the corresponding unique identifier from the display state data module for each of the display state changes made.

In another aspect of the present invention, the display state change is a color change of the display object. In still another aspect of the invention, the display state change is a change in a show/hide value of the display object.

In another aspect of the invention, the sequence number generator is further operative to assign sequence numbers to display state changes corresponding to the changed display objects, such that the plurality of sequence numbers provide a temporal relationship between each of the plurality of display state changes. In still another aspect of the invention, the last-made display state change is associated with the highest sequence number and the first-made display state change is associated with the lowest sequence number.

In another aspect of the present invention, the storage module is further operative to compare the sequence numbers assigned to particular stored display state changes. If a first sequence number is greater than a second sequence number, then the storage module will store the second sequence number along with its display state change, and its unique identifier to the display state data module. In still another aspect of the present invention, the storage module will not store the display state data corresponding to the second sequence number, if it is determined that the first sequence number is greater than the second sequence number.

In another aspect of the invention, the restoration module is further operative to compare a first unique identifier corresponding to a display object that requires display state data to a second unique identifier. If the first unique identifier and the second unique identifier are identical, then the restoration module will retrieve the second sequence number and the second display state change corresponding to the second unique identifier from the display state data module. If the first unique identifier and the second unique identifier are not identical, then the restoration module will not retrieve the second sequence number or the second display state change corresponding to the second unique identifier from the display state data module.

In another aspect of the invention, the display objects can be a cell, a row, a column, or a grid.

In another aspect of the present invention, the hierarchical data structure is a database. In yet another aspect of the invention, the hierarchical data structure is a spreadsheet.

BRIEF DESCRIPTION OF THE DRAWINGS

FIGS. 2*a–e* are illustrations of an exemplary display of an application program employing display objects within a hierarchical data structure.

DETAILED DESCRIPTION

Figure 1:
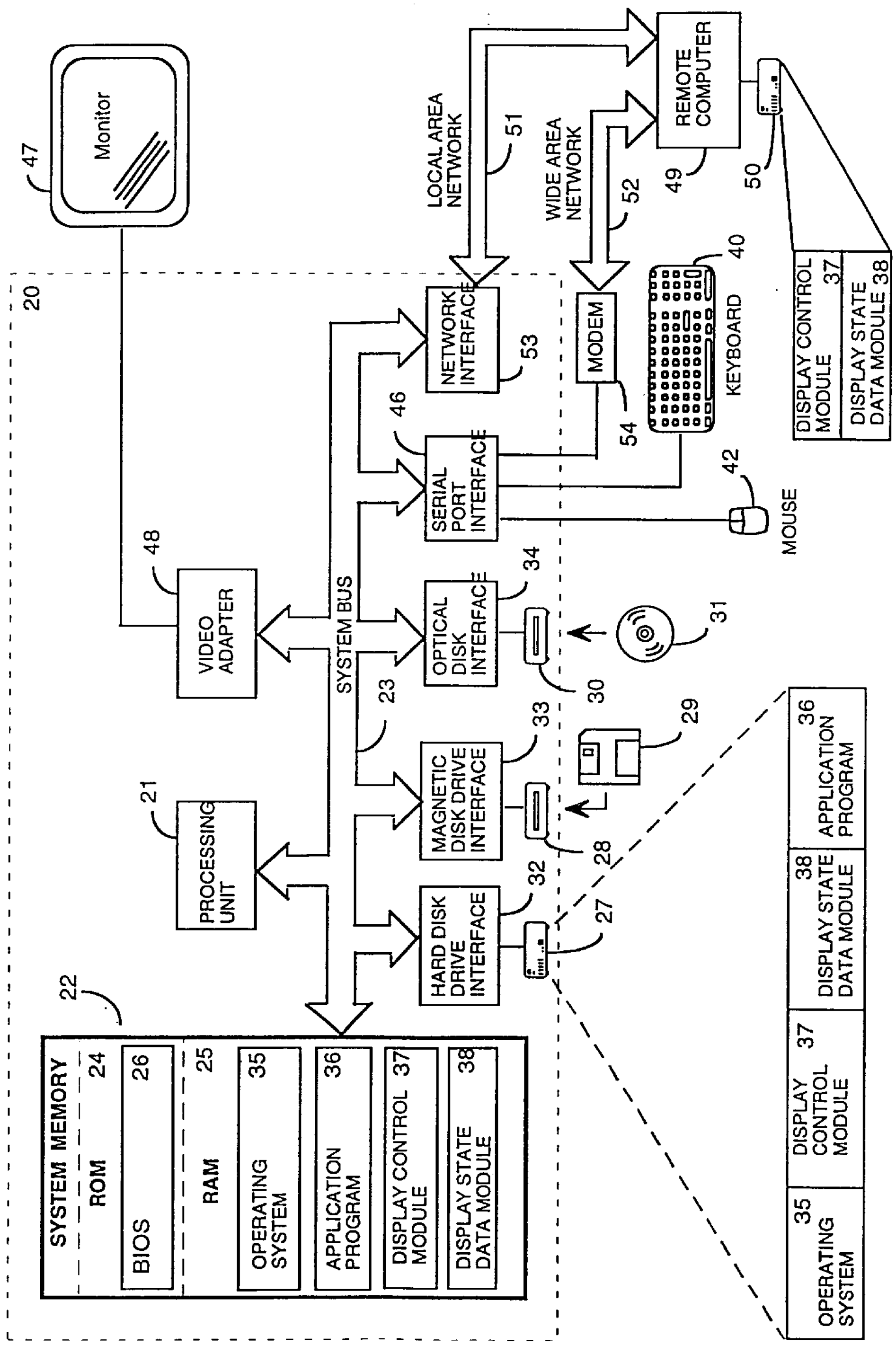
FIG. 1 is a block diagram of a personal computer that provides the operating environment for an embodiment of the present invention.

An exemplary embodiment of the present invention maintains and tracks changes to display state data for applications in which display data elements are maintained within a hierarchical data structure. Changes to display state data are tracked by means of a sequence number generator that assigns a sequence number to display state changes as they are made by the user. An exemplary embodiment of the present invention utilizes a process for storing the display state data and a process for loading the stored display state data.

In an exemplary embodiment of the present invention all display objects of a particular application program are organized within a grid. When a grid is created, a sequence number is initialized and will be allocated to the first display state data change that is made by the user to any element within the grid or to the entire grid. As subsequent display state data changes are made, the sequence number generator will assign sequence numbers to each change. Thus, the last change will be represented by the highest sequence number and the earliest change will be represented by the lowest sequence number. Generally, the process for storing display state data comprises a method of looping through all of the objects in the grid to store display state data that is relevant.

First, the storage process stores the last display state change made to the entire grid and stores the sequence number assigned to that change. Second, the process analyzes any sequence number that has been assigned to any row in the grid. If a row's sequence number is greater than the sequence number of the entire grid, then a row name, the last display state change, and the sequence number associated with that display state change is stored. After each row has been analyzed, the method analyzes each column. For each column that has experienced a display state change and has a sequence number associated with that display state change that is greater than the sequence number for the entire grid, the display state data is recorded. Specifically, the column's name, last display state change, and sequence number associated with the display state change is stored. Finally, each cell in the grid is analyzed, as described in connection with the rows and columns. If a cell's last display state change is associated with a sequence number that is greater than the sequence numbers for the entire grid, the cell's row and the cell's column, then the display state data for the cell is stored.

The storage process can be performed for a grid at the time that it is stored. A grid may be stored when an application program data file is closed and saved. By comparing sequence numbers and object superiority (within the data structure hierarchy), only the display state data changes that are relevant are stored. This saves memory and processing resources.

Once the display state data has been stored, it can be restored, such that when the data file is opened or a portion of the grid has been re-instantiated, it will be restored to the display state is effect when the display state data was last stored.

The process begins by reading (from the stored display state data) the last display state change made to the entire grid and the sequence number associated with that display state change. This sequence number will be maintained for the entire restoration process and is referred to as the MinSeqNum. Next, the display state of the whole grid is set to the display state that was just read from the data file. The display state of the entire grid is assigned a sequence number of zero. A temporary value, MaxSeqSet is also set to zero. Next, the process traverses all of the rows, columns and cells in the data file to determine which display state data to restore.

For each row stored in the data file, the process looks for a corresponding row by row name. If a row is found, then the display state of the row will be set to the last display state change made to the row and a sequence number will be assigned to the display state change. The sequence number assigned will be the sequence number read from the data file minus the MinSeqNum. Alternatively, the sequence numbers can simply be restored as they were saved. If the sequence number was set to a value greater than MaxSeqSet, then MaxSeqSet will be set to be the greater sequence number. This process is repeated for each row that is found as described.

The process proceeds by reading each column in the data file and looking for the column by column name. For each found column, the display state of the column is set to the last display state change stored in the data file and the sequence number of the display state change is set to the sequence number read from the data file minus MinSeqNum. If the sequence number was set to a value greater than MaxSeqSet, then MaxSeqSet is set to the greater sequence number.

Finally, each cell in the stored state is searched for and for each found cell, the display state is set to the last display state change read from the data file and the sequence number associated with the display state change is set to the sequence number read from the data file minus MinSeqNum. If the sequence number was set to a value greater than the MaxSeqSet, then MaxSeqSet is set to the greater sequence number. Once the entire grid has been restored, the sequence number generator will be set to MaxSeqSet plus one, so that the next sequence number allocated will be one more than the last sequence number assigned to a relevant display state change.

When cells are added to an existing grid, an exemplary embodiment of the present invention provides a method for determining the display state of the added cells. The display state of the added cells must comport with the display state of the row, cell and grid into which the cell is added. Thus, a determination of the display state of the cell is made by comparing the sequence numbers of the last display state changes made to the cell's column and row and to the grid itself. The state of the cell will be set to the state of the display object (row, cell, grid) corresponding to the greatest of these compared sequence numbers.

An Exemplary Operating Environment

FIG. 1 and the following discussion are intended to provide a brief, general description of a suitable computing environment in which the invention may be implemented. Although the present invention is described as a stand-alone process, those skilled in the art will recognize that the invention may be implemented in combination with other program modules or as a part of a larger program module. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, and component modules, such as a Display Control Module 37, and a Display State Data Module 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Those skilled in the art will appreciate that the exemplary embodiments of the present invention described herein is independent of any one operating environment and may be utilized in many environments. The above-described environment is simply an exemplary embodiment that is described for the purposes of providing a context in which to better describe various embodiments of the present invention.

An Exemplary Application Program Display

Figure 2E:
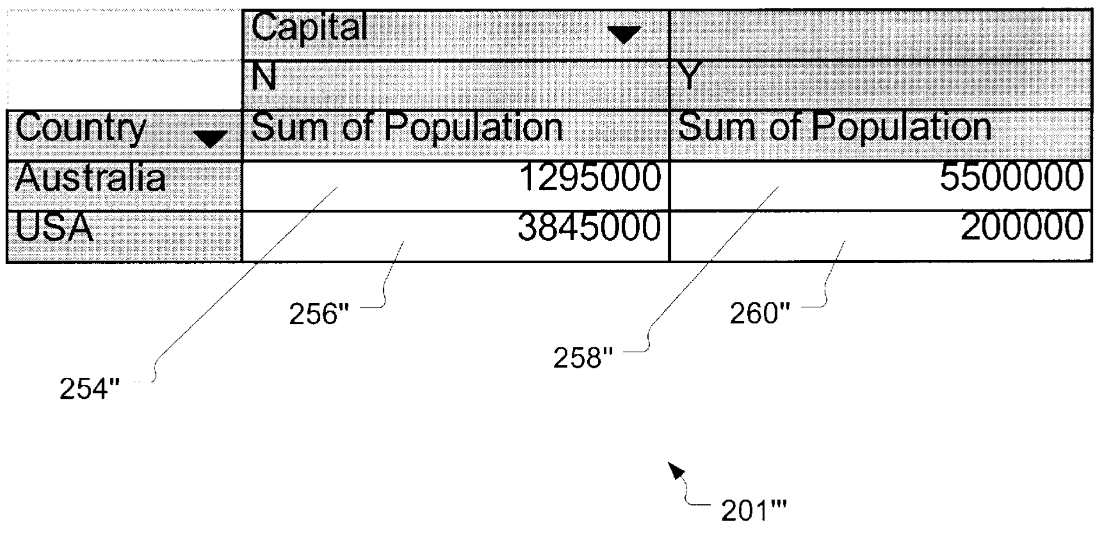

Referring now to FIGS. 2*a*–*e*, various views of an exemplary database application program's display are depicted. In FIG. 2*a*, the display of a database application program is depicted wherein a list of records 212–240 containing five field titles 202–210 (Country, State, City, Population, and Capital) are displayed. In this context, the entire display is a simple grid 200, having rows corresponding to each record as well as columns, corresponding to each different field title within each record. The grid 200 contains only raw data. That is, there is no non-displayed data supporting this raw data. All of the data in associated with this database is displayed by the application program in FIG. 2*a*. As will be discussed below, the present invention is well adapted to the maintenance of complex display data, where at least some of the displayed information is supported by underlying data that is not displayed. For the purposes of this discussion, the raw data fields (i.e., fields without supporting non-displayed data) will be called a "detail field". The raw data record to which a detail field corresponds will be referred to as a "detail record". The simple grid 200 that is a collection of detail fields will be referred to as a "detail grid".

In the display view of FIG. 2*a*, the detail grid 200 is a display object, each detail record 212–240 is also a display object, and each detail field within each detail record corresponding to the five field titles 202–210 is also a display object. In accordance with the data structure hierarchy associated with a typical database, the detail grid display object is superior to the detail record display objects and the detail record display objects are superior to the detail field display objects. Thus, if a user applies a green background to the detail grid display object, then each detail record display object and each detail field display object will be assigned a green background, because the detail grid display object is superior to the detail record display object and to the detail field display object. If the user subsequently applies a blue background to a particular detail record display object (e.g., record 224), then the detail grid display object is affected, because the detail record display object is part of the detail grid display object. However, if the user then re-applies a green background to the detail grid display object, then the once-blue detail record display object will be changed to green, because the detail grid display object is superior to the detail record display object. This example illustrates the data structure hierarchy of display objects as they pertain to the display of a simple detail grid.

In an exemplary embodiment of the present invention, the display state of each display object is maintained so that when a user re-loads a particular database of a user returns to a previously displayed portion of the data base, the display will be presented to the user in the condition in which the user left it. For the detail grid of FIG. 2*a* , this is a relatively simple procedure, consisting primarily of maintaining the requested display state changes in view of the hierarchy of the display objects. This process of display state storage and restoration will be described in more detail in connection with FIGS. 5–8.

The storage and restoration of display state data is made more difficult by more complex displays. In many database application programs, data presentation tools are provided that allow the user to create displays that display only particular aspects of the detail grid. This is generally desirable, so that the user can present a summary of the database's data without showing all of the underlying data. The complex grid contains cells rows and columns. However, unlike with the detail grid, the cells of a complex grid can contain more than one field and can correspond to more than one record. Similarly, the rows and columns of a complex grid can contain data corresponding to more than one record and/or field title. Using the underlying data of the detail grid of FIG. 2*a* , the complex grids of FIGS. 2*b*–2*e* illustrate various display modifications that can be performed by a database user that result in various complex grids. Each complex grid requires the maintenance of display data in order the effect the storage and restoration of the complex grid as shown.

Referring now to FIG. 2*b* , the detail records of FIG. 2*a* have been grouped by row, such that the detail records having common detail fields corresponding to the "Country" field title are grouped together in the "Australia" and "USA" rows. In this case, the detail records have been grouped into two cells 250, 252, because the detail records contained detail fields having only two countries. Had a third country been found in a detail fields, the grouping would have resulted in the creation of a third cell. Complex grid 201, therefore, has all of the underlying data of detail grid 200 (FIG. 2*a*), but has undergone a grouping, thereby creating a new display state.

Referring now to FIG. 2*c* , the complex grid 201 of FIG. 2*b* has been further modified to create complex grid 201'. The detail records underlying the cells 250, 252 of complex grid 201 (FIG. 2*b*) have been grouped by column, such that the detail records having common detail fields corresponding to the "Capital" field title are grouped together in the "N" and "Y" columns. In this case, the complex grid 201' contains four cells 254–260. Each of the four cells 254–260 are, thus, grouped by Country and by Capital. Had a third Capital value (e.g., Unknown) been found in the detail fields, the grouping would have resulted in the creation of six cells. Complex grid 201', therefore, has all of the underlying data of detail grid 200 (FIG. 2*a*) and of complex grid 201, but has undergone another grouping, thereby creating a new display state.

Referring now to FIG. 2*d*, the complex grid 201' of FIG. 2*c* has been further modified to create complex grid 201". Summary cells have been inserted to summarize the values in each of the four cells 254'–260'. Summary cells contain summary values that represent some aggregate value pertaining to a grouping of detail fields, detail records, and/or cells. Summary values are generated by the use of a summary function, such as a sum, average, count, minimum, or maximum. In this case, the summary cells 254'–260' contain the sum of the population detail fields of each cell.

Referring now to FIG. 2*e*, the complex grid 201" of FIG. 2*d* has been further modified to create complex grid 201'". The cells 254'–260' have had their state changed to "collapsed" (or "details hidden") and are now labeled 254'–260'. The cells now display only the summary cells pertaining to cells 254'–260' of FIG. 2*d*. The detail cells within the cells 254'–260' of FIG. 2*d* are hidden. They still exist and may be displayed again upon demand by the user by changing the state of the four cells 254"–260" to "expanded" (or "show details").

All of the display information associated with the complex grids of FIGS. 2*b*–2*e* needs to be maintained, such that the complex grids can be displayed upon demand in their last modified display state. However, the advent of data groupings and summary cells in database application programs has increased the amount of display data corresponding to a particular database. The amount of display data is further increased by the fact that as the number of rows and columns increases, the number of cells whose state is being stored increase at a higher rate since the number of cells is given by the number of rows multiplied by the number of columns. For example, if the number of rows and columns doubles, the number of cells increases four fold. If the method for storing and restoring the state of cells requires an amount of storage and computation proportional to the number of cells, the speed of the system will be much slower when larger girds are used. Because the amount of display data pertaining to a complex grid can be extensive, an efficient means of storing and restoring display data is desirable. An exemplary embodiment of the present invention provides such a means.

An Exemplary Display Data Flow Structure

Figure 3:
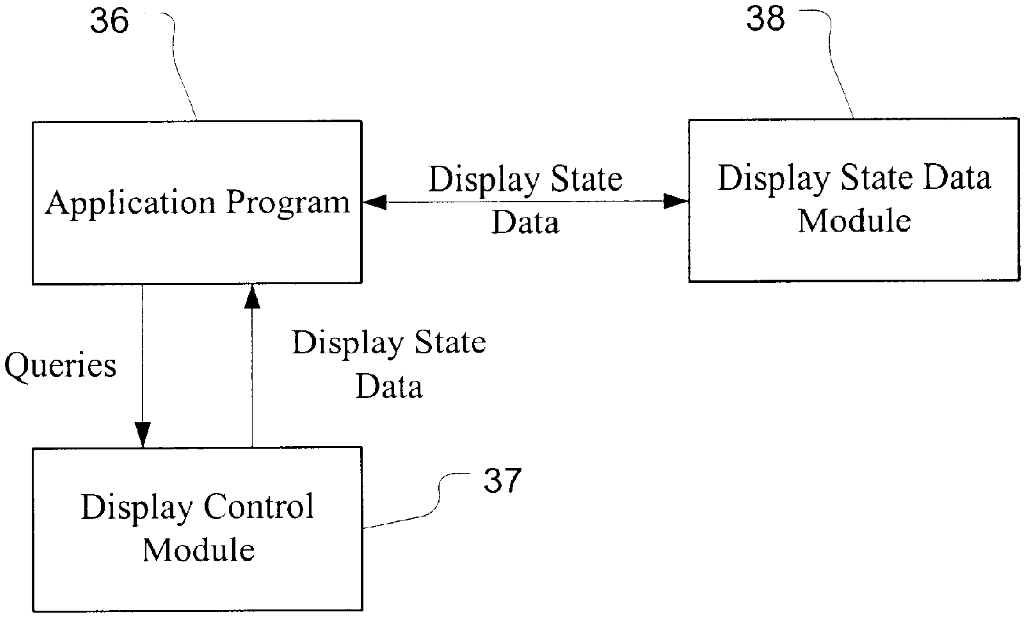
FIG. 3 is a block diagram illustrating the interaction between the major program modules employed in an embodiment of the present invention.

Referring now to FIG. 3, an application program 36 is shown with an associated display state data module 38 and a display control module 37. In an exemplary embodiment, the display control module 37 could be implemented as a stand-alone module that could be accessed by various application programs for generating display data associated with the various application programs. Alternatively, the display control module could be implemented as an integrated part of the application program 36. The display state data module 38 may be implemented as a separate data file associated with the application program 36 or simply as a portion of volatile memory (e.g., RAM) allocated for the maintenance of display state data. In any case, in an exemplary embodiment of the present invention, the display control module 37 is operative to efficiently store and restore display data associated with the application program 36 and the display state data module 38 provides the storage location for display state data stored by the application program 36.

The display control module receives queries from the application program 36. The application program 36 sends queries to the display control module 37 in order to determine the display state of one or more objects. The display control module 37 responds to such queries by sending the display state data associated with the particular objects queried by the application program 36. Once the application program has received the display state data, the application program may store the display state data in the display data module.

An Exemplary Method for Tracking Display State Changes

An exemplary embodiment of the present invention provides a system for tracking display state changes made to a complex grid. Display states include the display characteristics of a cell, such as the cell's background color and the cell's hide/show details status. The cells in a complex grid are maintained in a hierarchical data structure wherein the complex grid is superior to rows and columns and rows and columns are superior to cells. Thus, an exemplary embodiment of the present invention maintains display state changes in view of the hierarchical data structure. A change to the display state of a cell may not affect the display state of the row and column in which that cell resides, but a change to the row or column will change the display state of the cell, as the row and column are superior to the cell.

An exemplary embodiment of the present invention uses a sequence number generator for ordering the display state change requests by the user. The sequence number, the display state change request, and the affected display object (cell, row, column, or grid) are stored together in a single entry for use in restoration. When a display state storage is requested, the current display objects are analyzed to determine the relevance of the sequence number, and last display state change request on that display object. An exemplary embodiment of the present invention trades the inefficiency of storing some irrelevant display state data for the efficiency of quick display state data processing. Thus, if a display object's display data is superseded by a display state data having a larger sequence number or associated with superior display object, then that display data entry is irrelevant and is ignored in the display storage process.

Figure 4:
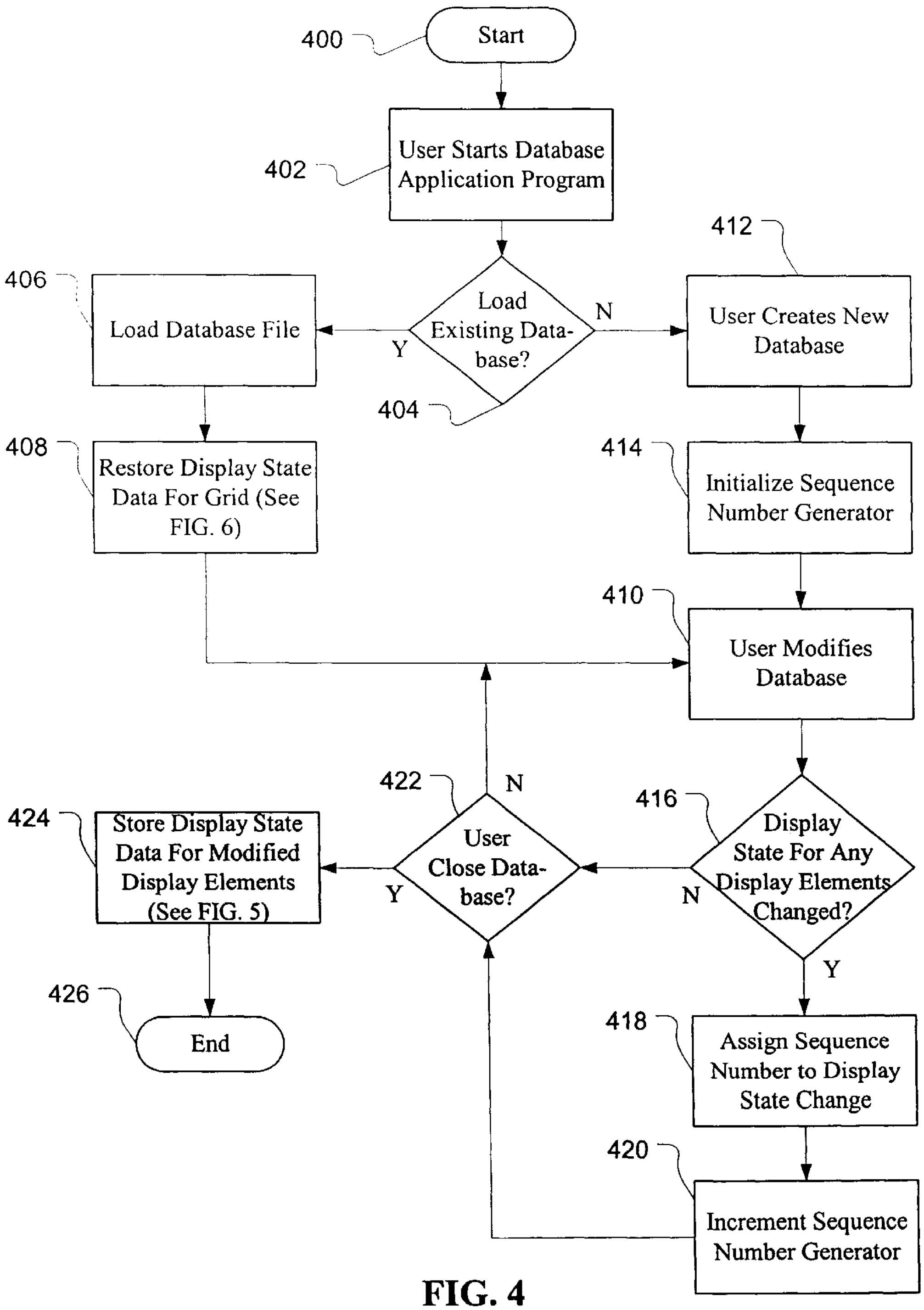
FIG. 4 is a flow chart illustrating an exemplary method for storing and restoring display state data in connection with a database application program.

Referring now to FIG. 4, a flowchart is shown, depicting an exemplary methods for storing and restoring display state data for a database application program. Those skilled in the art will appreciate that the description of this embodiment in the context of a database application program is for illustration purposes only and is not meant to limit the use of the present invention to database application programs. Indeed, the present invention is particularly useful for any application program in which display objects are maintained within a hierarchical data structure.

The method of FIG. 4 starts at step 400 and proceeds to step 402 wherein a user starts the database application program. The method then proceeds to decision block 404 in which a determination is made as to whether an existing database will be loaded. If the user loads an existing database, then the method follows the "Yes" branch to step 406 in which the database is loaded from a stored file. The method then proceeds to step 408 at which the display state data corresponding to the loaded database is restored for displaying within a display grid. This step is described in more detail below, in connection with FIG. 6.

The method then proceeds to step 410 wherein the user is free to modify and/or edit the database. Returning to decision block 404, if the user decides not to load an existing database, then the method branches along the "No" branch to step 412. At 412, the user creates a new database and the method proceeds to 414 and a sequence number generator is initialized. The method the proceeds to step 410 wherein the user is free to modify and/or edit the database.

From step 410, the method proceeds to decision block 416 where a determination is made as to whether the display state for any display objects (cells, columns, rows, or the grid) have been changed. If no display state has been changed, then no display state change data needs to be maintained and the method proceeds to decision block 422. On the other hand, if a determination is made that display state data has been changed, then the method branches to step 418 where the next sequence number generated by the sequence number generator is assigned to the display state change that was made. The method then proceeds to step 420 at which the sequence number generator is incremented, so that the next display state change will be assigned a unique sequence number.

The method then branches to decision block 422 where a determination is made as to whether the user has chosen to close the database. If the user has not closed the database, then the method branches back to step 410 along the "No" branch, wherein the user is free to modify and/or edit the database. If, on the other hand, the user has chosen to close the database, then the method branches along the "Yes" branch to step 424 and the display state data for the database's modified display objects is stored. Step 424 is described in more detail below, in connection with FIG. 6. The method then branches to step 426 and ends.

An Exemplary Method for Storing Display State Data

Figure 5A:
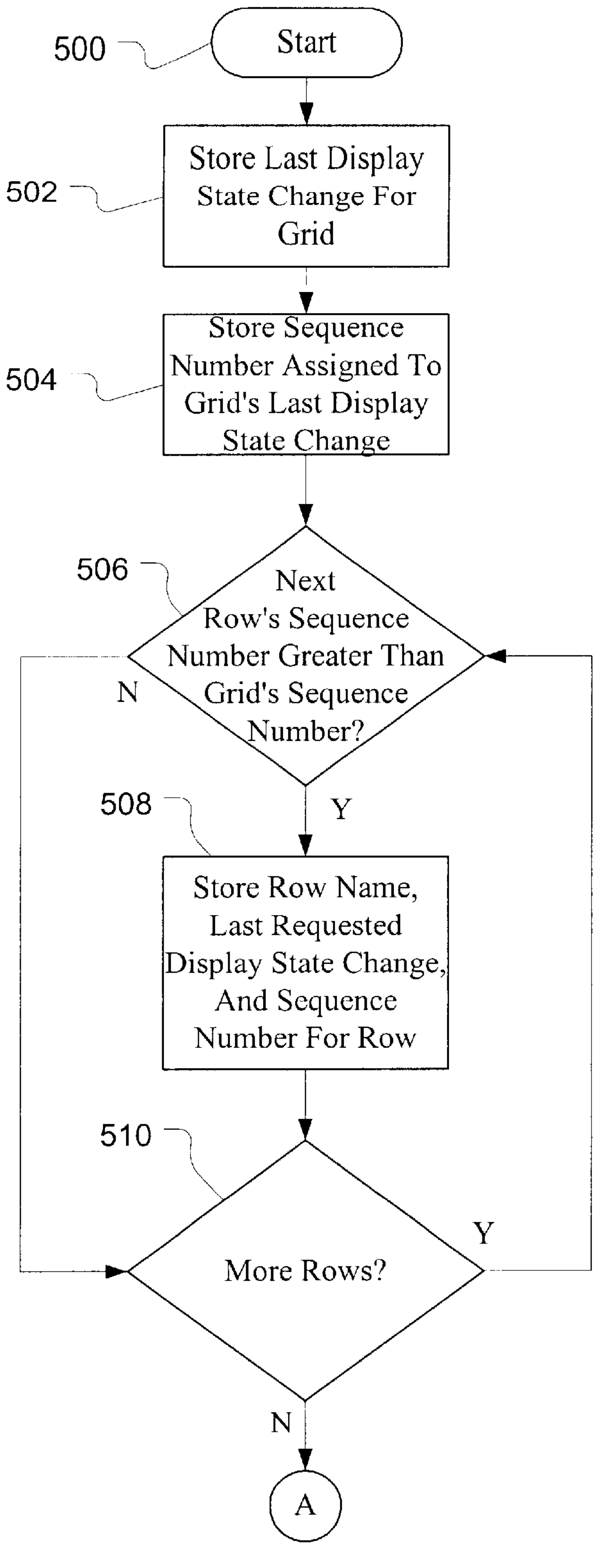
FIG. 5 is a flow chart illustrating an exemplary method for storing display state data.
Figure 5B:
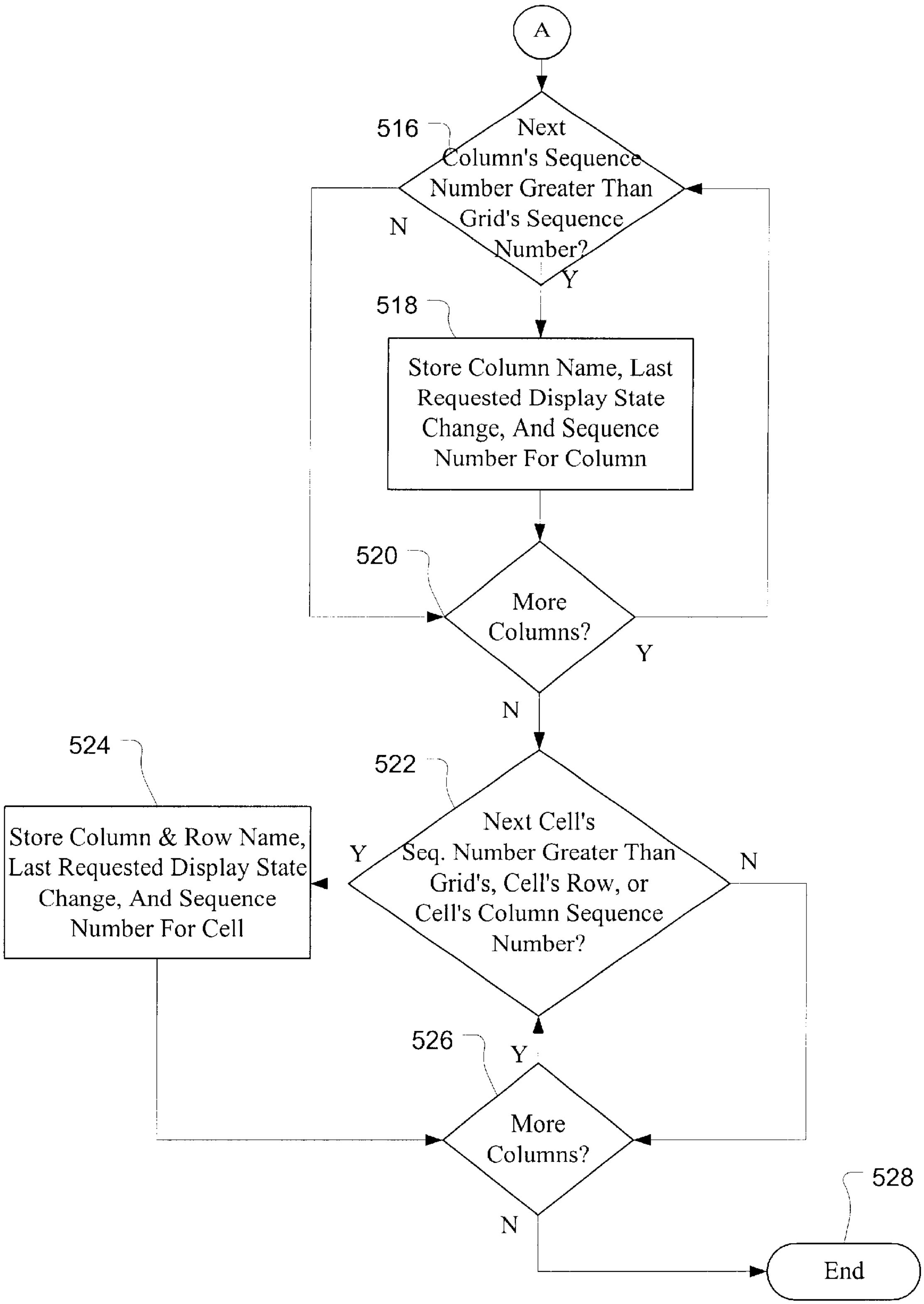

In FIGS. 5*a* and 5*b*, two parts of a single flowchart are shown, depicting an exemplary method for storing display state data. Referring now to FIG. 5*a*, the method starts at step 500 and proceeds to step 502. At step 502, the last display state change for the entire grid is stored. The method then proceeds to step 504 and stores the sequence number assigned to the grid's last display state change. The sequence number is stored such that it corresponds to the display state change stored in step 502 and vice versa. The method then proceeds to decision block 506 at which a determination is made as to whether the next row's sequence number is greater than the grid's sequence number. In the first instance, the "next" row will be the first row of the grid—in subsequent instances, the "next" row is meant to indicate that the rows are processed sequentially.

If the next row's sequence number is greater than the grid's sequence number, then the method branches along the "Yes" branch to step 508. At step 508, the name of the row (or some other unique row identifier) is stored along with the last requested display state change and the row's sequence number. The method then proceeds to decision block 510.

Returning to decision block 506, if a determination is made that the row's sequence number is not greater than the grid's sequence number, then the method branches to decision block 510. At decision block 510, a determination is made as to whether more un-stored rows exist in the grid (i.e., whether there is a "next" row). If one or more un-stored rows exist, then the method branches along the "Yes" branch to decision block 506. If a determination is made at decision block 510 that no more un-stored rows exist in the grid, then the method branches along the "No" branch to decision block 516 (FIG. 5*b*) through connectors 512 and 514.

Referring now to FIG. 5*b*, at decision block 516, a determination is made as to whether the next column's sequence number is greater than the grid's sequence number. As discussed in connection with FIG. 5*a*, in the first instance, the "next" column will be the first column of the grid—in subsequent instances, the "next" column is meant to indicate that the columns are processed sequentially.

If the next column's sequence number is greater than the grid's sequence number, then the method branches along the "Yes" branch to step 518. At step 518, the name of the column (or some other unique column identifier) is stored along with the last requested display state change and the column's sequence number. The method then proceeds to decision block 520.

Returning to decision block 516, if a determination is made that the column's sequence number is not greater than the grid's sequence number, then the method branches to decision block 520. At decision block 520, a determination is made as to whether more un-stored columns exist in the grid (i.e., whether there is a "next" column). If one or more un-stored columns exist, then the method branches along the "Yes" branch to decision block 516. If a determination is made at decision block 520 that no more un-stored columns exist in the grid, then the method branches along the "No" branch to decision block 522.

At decision block 522, a determination is made as to whether the next cell's sequence number is greater than the grid's sequence number column's sequence number, or row's sequence number. As discussed in connection with FIG. 5*a*, in the first instance, the "next" cell will be the first cell of the grid—in subsequent instances, the "next" cell is meant to indicate that the cells are processed sequentially.

If the next cell's sequence number is greater than the grid's sequence number, then the method branches along the "Yes" branch to step 524. At step 524, the name of the cell (or some other unique cell identifier) is stored along with the last requested display state change and the cell's sequence number. The method then proceeds to decision block 526.

Returning to decision block 522, if a determination is made that the cell's sequence number is not greater than the grid's sequence number, then the method branches to decision block 526. At decision block 526, a determination is made as to whether more un-stored cells exist in the grid (i.e., whether there is a "next" cell). If one or more un-stored cells exist, then the method branches along the "Yes" branch to decision block 522. If a determination is made at decision block 526 that no more un-stored cells exist in the grid, then the method branches along the "No" branch to step 528 and the method ends.

An Exemplary Method for Restoring Display State Data

Figure 6A:
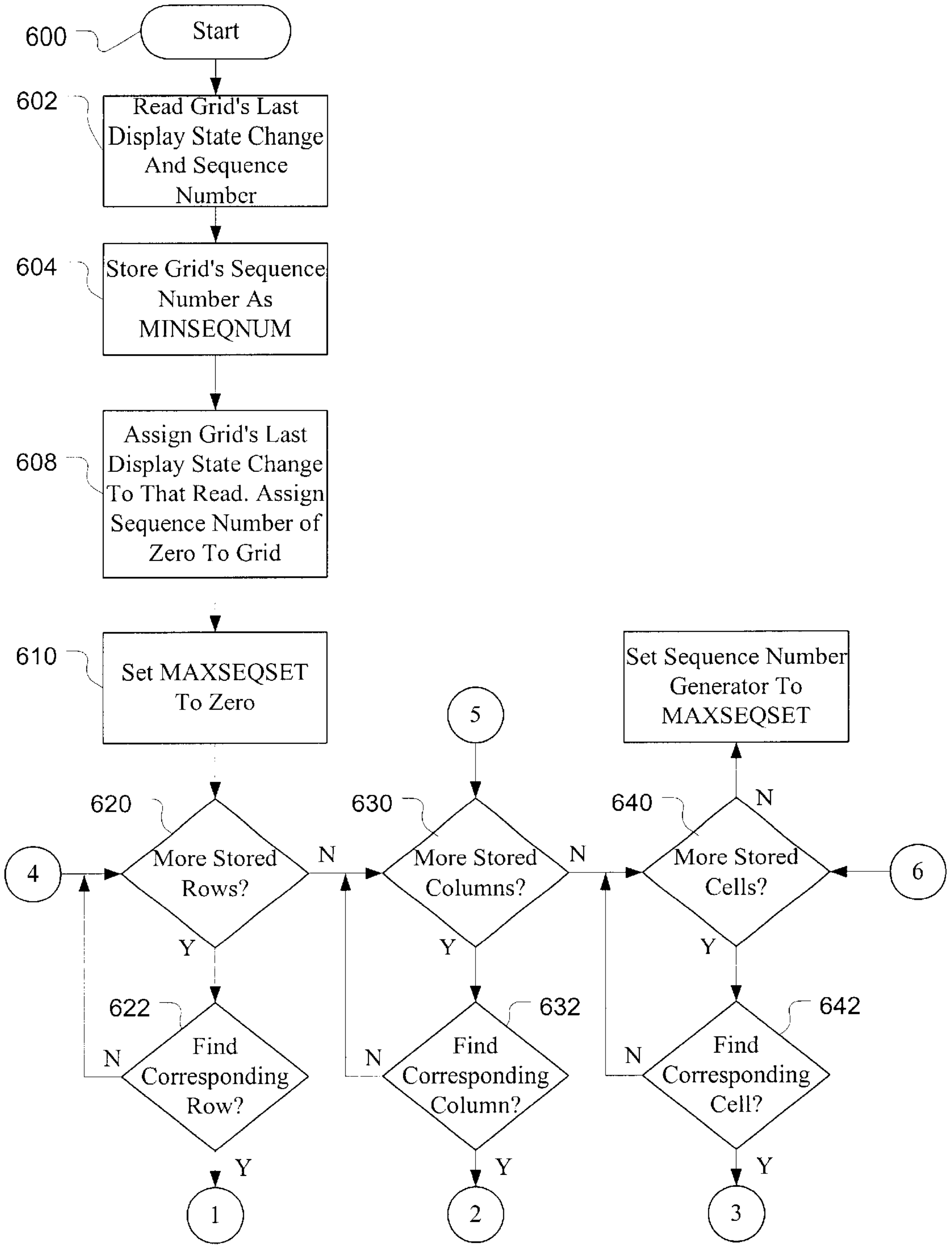
FIGS. 6*a* and 6*b* are portions of a single flow chart illustrating an exemplary method for restoring display state data.
Figure 6B:
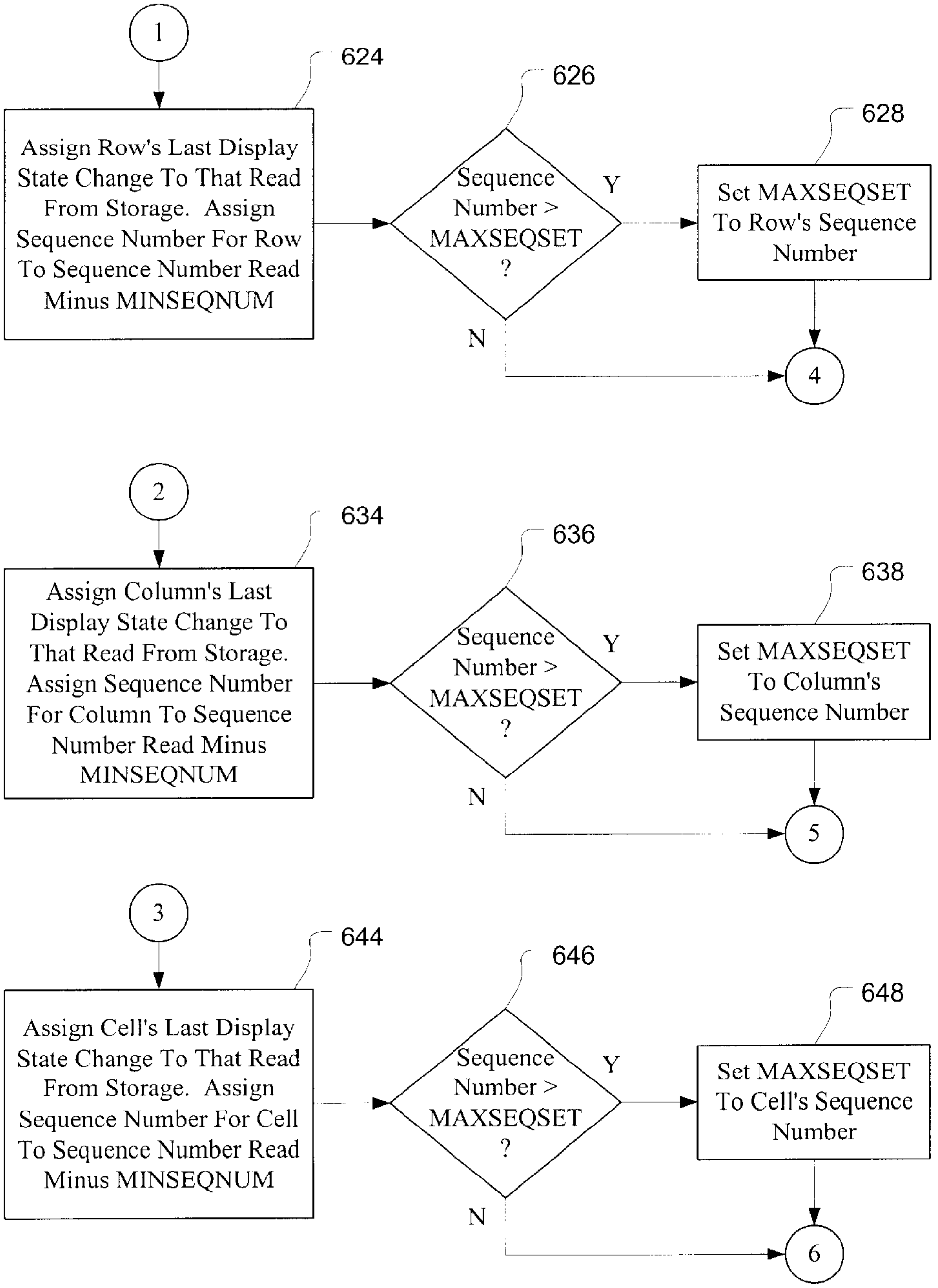

As discussed above, an exemplary embodiment of the present invention also provides a method for restoring the grid after the display state data has been stored, such as by the exemplary method depicted in FIGS. 5*a* and 5*b*. Referring now to FIG. 6, a flowchart is shown, depicting an exemplary method for restoring display state data. The method starts at step 600 and proceeds to step 602. At step 602, the grid's last display state change and a corresponding sequence number are read from storage. The method proceeds to step 604 where the grid's sequence number read from storage is stored as a value referred to as MinSeqNum.

The method then proceeds to step 608 in which the grid's display state is set to the last display state change read from storage. This step also sets the sequence number for the grid to zero, because it represents the first display state change made (actually, restored) to the grid. The method then proceeds to step 610 at which a value referred to as MaxSeqSet is set to zero. This step initializes the MaxSeqSet value so that the maximum sequence number assigned to any object in the grid can be maintained.

The step then proceeds to decision block 620, in which a determination is made as to whether there is display state data for one or more rows in storage. If display state data corresponding to rows is found, then the method branches along the "Yes" branch to decision block 622. At decision block 622, a determination is made as to whether the grid contains a row that corresponds to the row for which display state data exists in storage. This determination is made by comparing row names (or other unique row identifiers). If a determination is made that there is no corresponding row, then the stored display state data is not needed and the method branches along the "No" branch to decision block 620 in order to determine whether any other row display state data remains in storage. If, on the other hand, a corresponding row is found, then the method branches along the "Yes" branch (via connector 1) to step 624 of FIG. 6*b*. At step 624, the last display state change for the found row is set to the last display state change read from storage. This step also assigns to the found row, the sequence number read from storage minus the MinSeqNum. By reducing the assigned sequence number by MinSeqNum, the method reduces the potential for the assigned sequence numbers to exceed the limits of a computer system's capabilities.

The method then proceeds to decision block 626 wherein a determination is made as to whether the sequence number assigned to the row is greater than the MaxSeqSet value. If the sequence number assigned to the row is greater than the MaxSeqSet value, then the method branches along the "Yes" branch to step 628 where the MaxSeqSet value is set to the assigned sequence number. The method then proceeds to decision block 620 (via connector 4) and the steps pertaining to row processing are repeated until no more row display state data is found in storage. Returning to decision block 626, if the sequence number assigned to the row is not greater than the MaxSeqSet value, then the method branches along the "No" branch to decision block 620 (via connector 4) and the steps pertaining to row processing are repeated until no more row display state data is found in storage.

Returning to step 620, if no additional row display state data is found in storage, then the step branches along the "No" branch to step 630, in which a determination is made as to whether there is display state data for one or more columns in storage. If display state data corresponding to columns is found, then the method branches along the "Yes" branch to decision block 632. At decision block 632, a determination is made as to whether the grid contains a column that corresponds to the column for which display state data exists in storage. This determination is made by comparing column names (or other unique column identifiers). If a determination is made that there is no corresponding column, then the stored display state data is not needed and the method branches along the "No" branch to decision block 630 in order to determine whether any other column display state data remains in storage. If, on the other hand, a corresponding column is found, then the method branches along the "Yes" branch (via connector 2) to step 634 of FIG. 6*b*. At step 634, the last display state change for the found column is set to the last display state change read from storage. This step also assigns to the found column, the sequence number read from storage minus the MinSeqNum. By reducing the assigned sequence number by MinSeqNum, the method reduces the potential for the assigned sequence numbers to exceed the limits of a computer system's capabilities.

The method then proceeds to decision block 636 wherein a determination is made as to whether the sequence number assigned to the column is greater than the MaxSeqSet value. If the sequence number assigned to the column is greater than the MaxSeqSet value, then the method branches along the "Yes" branch to step 638 where the MaxSeqSet value is set to the assigned sequence number. The method then proceeds to decision block 630 (via connector 5) and the steps pertaining to column processing are repeated until no more column display state data is found in storage. Returning to decision block 636, if the sequence number assigned to the column is not greater than the MaxSeqSet value, then the method branches along the "No" branch to decision block 630 (via connector 5) and the steps pertaining to column processing are repeated until no more column display state data is found in storage.

Returning to step 630, if no additional column display state data is found in storage, then the step branches along the "No" branch to step 640, in which a determination is made as to whether there is display state data for one or more cells in storage. If display state data corresponding to cells is found, then the method branches along the "Yes" branch to decision block 642. At decision block 642, a determination is made as to whether the grid contains a cell that corresponds to the cell for which display state data exists in storage. This determination is made by comparing cell names (or other unique cell identifiers). If a determination is made that there is no corresponding cell, then the stored display state data is not needed and the method branches along the "No" branch to decision block 640 in order to determine whether any other cell display state data remains in storage. If, on the other hand, a corresponding cell is found, then the method branches along the "Yes" branch (via connector 3) to step 644 of FIG. 6*b*. At step 644, the last display state change for the found cell is set to the last display state change read from storage. This step also assigns to the found cell, the sequence number read from storage minus the MinSeqNum. By reducing the assigned sequence number by MinSeqNum, the method reduces the potential for the assigned sequence numbers to exceed the limits of a computer system's capabilities.

The method then proceeds to decision block 646 wherein a determination is made as to whether the sequence number assigned to the cell is greater than the MaxSeqSet value. If the sequence number assigned to the cell is greater than the MaxSeqSet value, then the method branches along the "Yes" branch to step 648 where the MaxSeqSet value is set to the assigned sequence number. The method then proceeds to decision block 640 (via connector 6) and the steps pertaining to cell processing are repeated until no more cell display state data is found in storage. Returning to decision block 646, if the sequence number assigned to the cell is not greater than the MaxSeqSet value, then the method branches along the "No" branch to decision block 640 (via connector 6) and the steps pertaining to cell processing are repeated until no more cell display state data is found in storage.

Thus, the entire grid is restored by progressing through the stored display state data on an object by object basis. Where the stored data contains display state data that is unneeded, then that display state data is simply ignored. By maintaining object names or other unique object identifiers, the method matches objects to stored display state data.

An Exemplary Method for Determining the Current Display State of a Cell

Figure 7:
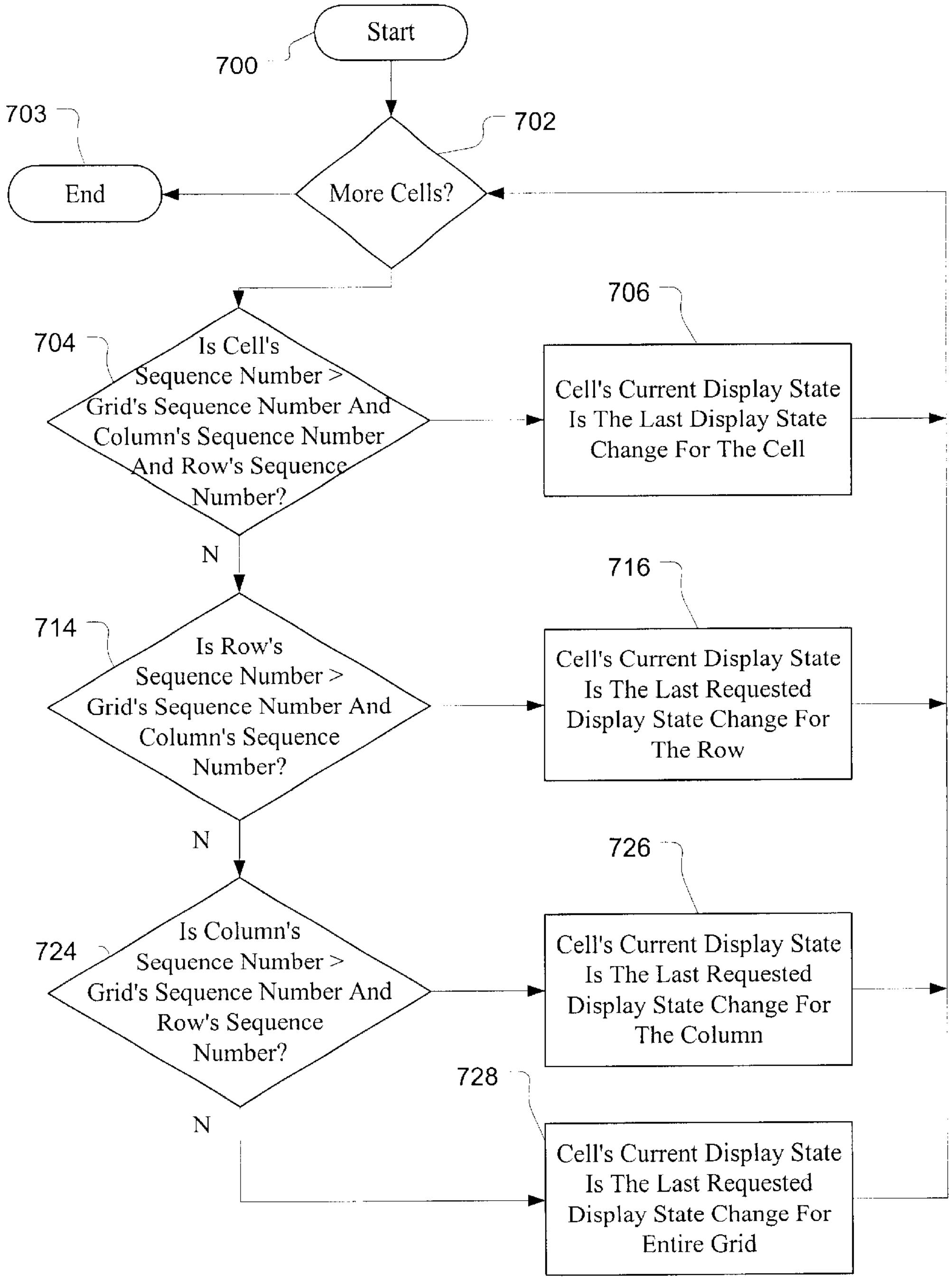
FIG. 7 is a flow chart illustrating an exemplary method for determining the current display state of a display object.

In some cases, it may be necessary to determine the current display state for a particular cell. One instance in which this is necessary is when a cell, a row of cells or a column of cells is added to the grid. In this instance, the current state of the cell must be determined in order for the cell's display state to comport with the portion of the grid into which the cell is added. Referring now to FIG. 7, an exemplary method for determining the current display state of a cell is depicted.

The method of FIG. 7 begins at step 700 and proceeds to step 702, where a determination is made as to whether one or more cells requires a determination of a current display state. If no cells require such a determination, then the method branches along the "No" branch to step 703 and the method ends. If one or more cells requires a current display state determination, then the method branches along the "Yes" branch to decision block 704. At decision block 704, a determination is made as to whether the cell's sequence number is greater than the grid's sequence number, the column's sequence number and the row's sequence number. In the context of FIG. 7, references to a row or a column indicate the row or column in which the particular cell resides. If the cell's sequence number is greater than the sequence numbers of the three other objects, then the method branches to step 706. At step 706, the cell's current display state is determined to be the last display state change for the cell. The method then proceeds to decision block 702 and the process is repeated for any other cells requiring a current display state determination. If, on the other hand, a determination is made at decision block 704 that the cell's sequence number is not greater than one or more of the sequence numbers of the three other objects, then the method branches to step 714.

At decision block 714, a determination is made as to whether the cell's sequence number is greater than the grid's sequence number and the column's sequence number. If the cell's sequence number is greater than the sequence numbers of the two other objects, then the method branches to step 716. At step 716, the cell's current display state is determined to be the last display state change for the row. The method then proceeds to decision block 702 and the process is repeated for any other cells requiring a current display state determination. If, on the other hand, a determination is made at decision block 714 that the cell's sequence number is not greater than one or more of the sequence numbers of the two other objects, then the method branches to step 724.

At decision block 724, a determination is made as to whether the cell's sequence number is greater than the grid's sequence number and the row's sequence number. If the cell's sequence number is greater than the sequence numbers of the two other objects, then the method branches to step 726. At step 726, the cell's current display state is determined to be the last display state change for the column. The method then proceeds to decision block 702 and the process is repeated for any other cells requiring a current display state determination.

If, on the other hand, a determination is made at decision block 724 that the cell's sequence number is not greater than one or more of the sequence numbers of the two other objects, then the method branches to step 728. At step 728, the cell's current display state is determined to be the last display state change for the entire grid. The method then proceeds to decision block 702 and the process is repeated for any other cells requiring a current display state determination.

Although the descriptions of the display state data storage and restoration system and method are directed to the storage of display state data for database display objects, those skilled in the art will appreciate that display state data for virtually any application program utilizing a hierarchical data structure could be stored and restored using the system and/or method described. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A system for storing and restoring display state data for a hierarchical data structure, the system comprising:

a sequence number generator operative to assign a first sequence number to a first display state change corresponding to a first display object;

a storage module operative to store the first sequence number, the first display state change, and a first unique identifier of the first display object to a display state data module_and wherein the storage module is further operative to:

compare the first sequence number to a second sequence number assigned to a second display state change corresponding to a second object; and store the second sequence number, the second display state change, and a second unique identifier of the second display object to the display state data module, in response to a determination that the second sequence number is greater than the first sequence number; and a restoration module operative to retrieve the first sequence number, the first display state change, and the first unique identifier of the first display object from the display state data module.

2. The system of claim 1, wherein the first display state change is a color change of the display object.

3. The system of claim 1, wherein the first display state change is a change in a show/hide value of the display object.

4. The system of claim 1, wherein the sequence number generator is further operative to assign a plurality of sequence numbers to a plurality of display state changes corresponding to a plurality of display objects, such that the plurality of sequence numbers provide a temporal relationship between each of the plurality of display state changes.

5. The system of claim 4, wherein a last made display state change is associated with a highest one of the plurality of sequence numbers and a first made display state change is associated with a lowest one of the plurality of sequence numbers.

6. The system of claim 1, wherein the storage module is further operative to not store the second sequence number, the second display state change, or the second unique identifier of the second display object to the display state data module, in response to a determination that the first sequence number is greater than the second sequence number.

7. The system of claim 1, wherein the first display object is an object selected from the group consisting of:

a cell;

a row;

a column; and a grid.

8. The system of claim 1, wherein the hierarchical data structure is a display of data stored in a database.

9. The system of claim 1, wherein the hierarchical data structure is a display of data stored in a spreadsheet.

10. A system for storing and restoring display state data for a hierarchical data structure, the system comprising:

a sequence number generator operative to assign a first sequence number to a first display state change corresponding to a first display object;

a storage module operative to store the first sequence number, the first display state change, and a first unique identifier of the first display object to a display state data module; and a restoration module operative to retrieve the first sequence number, the first display state change, and the first unique identifier of the first display object from the display state data module, wherein the restoration module is further operative to:

compare a second unique identifier to a third unique identifier corresponding to a third display object for which display state data is required;

retrieve a second sequence number and a second display state change corresponding to the second unique identifier from the display state data module, in response to a determination that the second unique identifier and the third unique identifier are identical; and not retrieve the second sequence number and the second display state change corresponding to the second unique identifier from the display state data module, in response to a determination that the second unique identifier and the third unique identifier are not identical.

11. A method for storing display state data for display objects including a grid, at least one row, at least one column, and at least one cell, the method comprising the steps of:

storing a last display state change for the grid;

storing a sequence number assigned to the last display state change for the grid;

comparing a row sequence number to a grid sequence number;

storing a row identifier, a last requested display state change for the row, and the row sequence number, in response to a determination that the row sequence number is greater than the grid sequence number;

comparing a column sequence number to the grid sequence number; and storing a column identifier, a last requested display state change for the column, and the column sequence number, in response to a determination that the column sequence number is greater than the grid sequence number.

12. The method of claim 11, further comprising the steps of:

comparing a cell sequence number to a grid sequence number, the row sequence number and the column sequence number; and storing the row identifier, the column identifier, a last requested display state change for the cell, and the cell sequence number, in response to a determination that the cell sequence number is greater than the grid sequence number, the row sequence number and the column sequence number.

13. The method of claim 12, wherein the steps of comparing a cell sequence number and storing the row identifier, the column identifier, a last requested display state change for the cell, and the cell sequence number are repeated for each of the at least one cells in the grid.

14. The method of claim 11, wherein the steps of comparing a row sequence number and storing a row identifier, a last requested display state change for the row, and the row sequence number are repeated for each of the at least one rows in the grid.

15. The method of claim 11, wherein the steps of comparing a column sequence number and storing a column identifier, a last requested display state change for the column, and the column sequence number are repeated for each of the at least one columns in the grid.

16. A computer-readable medium, comprising computer-executable instructions for performing the steps of claim 11.

17. A method for restoring display state data for display objects including a grid, at least one row, at least one column, and at least one cell, the method comprising the steps of:

reading a last display state for the grid and a grid sequence number from a display state data module;

setting a grid display state to the last display state for the grid;

setting a grid sequence number to the grid sequence number read from a display state module;

determining whether the display state data module contains display state data for at least one row;

reading a last display state for the at least one row and a row sequence number from the display state data module, in response to a determination that the display state data module contains display state data for at least one row;

setting a row display state to the last display state for the at least one row, in response to a determination that the display state data module contains display state data for at least one row;

determining whether the display state data module contains display state data for at least one column;

reading a last display state for the at least one column and a column sequence number from the display state data module, in response to a determination that the display state data module contains display state data for at least one column; and setting a column display state to the last display state for the at least one column, in response to a determination that the display state data module contains display state data for at least one column.

18. The method of claim 17, further comprising the steps of:

determining whether the display state data module contains display state data for at least one cell;

reading a last display state for the at least one cell and a cell sequence number from the display state data module, in response to a determination that the display state data module contains display state data for at least one cell; and setting a cell display state to the last display state for the at least one cell, in response to a determination that the display state data module contains display state data for at least one cell.

19. The method of claim 18, further comprising the steps of:

determining whether the cell sequence number is greater than a MaxSeqSet value; and setting the MaxSeqSet value to the cell sequence number, in response to a determination that the cell sequence number is greater than the MaxSeqSet value.

20. A computer-readable medium, comprising computer-executable instructions for performing the steps of claim 18.

21. The method of claim 17, further comprising the step of setting a MinSeqNum value to the grid sequence number.

22. The method of claim 17, further comprising the step of setting the grid sequence number to zero.

23. The method of claim 17, further comprising the step of setting a MaxSeqSet value to zero.

24. The method of claim 17, further comprising the steps of:

determining whether the row sequence number is greater than a MaxSeqSet value; and setting the MaxSeqSet value to the row sequence number, in response to a determination that the row sequence number is greater than the MaxSeqSet value.

25. The method of claim 17, further comprising the steps of:

determining whether the column sequence number is greater than a MaxSeqSet value; and setting the MaxSeqSet value to the column sequence number, in response to a determination that the column sequence number is greater than the MaxSeqSet value.

26. The method of claim 17, further comprising the step of setting a sequence number generator to MaxSeqSet.

27. A computer-readable medium, comprising computer-executable instructions for performing the steps of claim 17.

* * * * *

UNITED STATES PATENT AND TRADEMARK OFFICE

CERTIFICATE OF CORRECTION

PATENT NO. : 6,711,715 B1
DATED : March 23, 2004
INVENTOR(S) : Grealish

It is certified that error appears in the above-identified patent and that said Letters Patent is hereby corrected as shown below:

Column 3,
Line 66, delete "FIG. 5" and insert -- FIGS. 5a and 5b are --

Column 7,
Line 35, delete "in"

Column 8,
Line 22, insert -- , -- after "cells"

Column 15,
Line 63, delete "__"

Signed and Sealed this

Tenth Day of August, 2004

JON W. DUDAS
*Acting Director of the United States Patent and Trademark Office*